United States Patent [19]
Ryu

[11] Patent Number: 5,822,421
[45] Date of Patent: Oct. 13, 1998

[54] COMMUNICATION METHOD BETWEEN PROCESSORS IN A DECENTRALIZED MULTI-NODE EXCHANGE SYSTEM

[75] Inventor: Sang-Shin Ryu, Suwon, Rep. of Korea

[73] Assignee: SamSung Electronics Co., Ltd., Suwon, Rep. of Korea

[21] Appl. No.: 272,304

[22] Filed: Jul. 8, 1994

Related U.S. Application Data

[63] Continuation of Ser. No. 899,888, Jun. 17, 1992, abandoned.

[30] Foreign Application Priority Data

Sep. 19, 1991 [KR] Rep. of Korea .................. 1991-16416

[51] Int. Cl.$^6$ ..................................................... H04M 7/00
[52] U.S. Cl. ............................ 379/225; 379/279; 379/241
[58] Field of Search ......................... 395/200.43, 200.44, 395/200.45; 379/207, 220, 221, 225, 229, 230, 241

[56] References Cited

U.S. PATENT DOCUMENTS

| | | | |
|---|---|---|---|
| 4,442,321 | 4/1984 | Stehman | 379/220 |
| 4,479,195 | 10/1984 | Herr et al. | 364/900 |
| 5,179,665 | 1/1993 | Roslund et al. | 395/200.43 |
| 5,214,759 | 5/1993 | Yamaoka et al. | 395/200 |
| 5,276,896 | 1/1994 | Rimmer et al. | 395/200.44 |

*Primary Examiner*—Daniel S. Hunter
*Attorney, Agent, or Firm*—Robert E. Bushnell, Esq.

[57] ABSTRACT

A communicating method between two processors in a decentralized multi-node exchange system comprising a central processing module for controlling the system by processing events related to a call process, and a signal processing module having a common memory, for transmitting/receiving a signal message generated in the exchange system to/from the central processing module through the common memory. In order to transmit a message through the common memory, the message is transmitted to a message transmitting buffer when the message transmitting buffer is emptied, and an interrupt is generated to a counterpart receiving the message when the transmitting buffer is not emptied. Meanwhile, in order to receive a message, the number of receiving messages is set during a period of time when the interrupt is received or when it is set to receive a message, and a message corresponding to the number of the receiving message is read from the common memory. Thus, since the transmission and reception of a message is controlled by the interrupt, messages can be transmitted and received at high speed and the real time response of a system is possible.

13 Claims, 5 Drawing Sheets

COMMUNICATION METHOD BETWEEN PROCESSORS IN A DECENTRALIZED MULTI-NODE EXCHANGE SYSTEM

This is a continuation of application Ser. No. 07/899,888, filed 17 Jun. 1992, now abandoned.

BACKGROUND OF THE INVENTION

The present invention relates to a communication method in decentralized multi-node exchange system, and more particularly a method for transmitting and receiving a message between two processors at high speed in a decentralized multi-node exchange system.

Assuming that an independently operable private branch exchange (PBX) is a node, a decentralized multi-node exchange system constitutes a network with a plurality of the nodes and is used like one exchange.

FIG. 1 is a diagram showing the configuration of such a decentralized multi-node exchange system. The respective nodes Node1 to Node5 are all independently operable exchange systems such as the private branch exchanges. The decentralized multi-node exchange system performs all the call processes by transmitting/receiving a message between the nodes. For instance, if a subscriber belonging to Node1 calls a subscriber belonging to Node3, a speech path between the two subscribers is formed by transmitting/receiving a call process message between the nodes Node1 and Node3. The configuration of each node of the decentralized multi-node exchange is shown in FIG. 2.

Referring to FIG. 2, a central processing module (CPM) 12 is a main processor for processing all the main tasks in the exchange. A signal processing module (SPM) 14 is a front end processor (FEP) for transmitting/receiving various signal messages generated in the exchange. A line processing module (LPM) 16 senses events from each subscriber through a subscriber control module 18 to inform the CPM 12 of the events through the SPM 14. Further, the LPM 16 analyzes a signal message transmitted from the SPM 14 to ring the bell of the telephone of the subscriber. An inter-node interface (INI) 22 is a processor for transmitting/receiving a message to/from another node. The subscriber control module 18 supplies a current required for a call, monitors a loop, supplies a ring to the subscriber's telephone 20, and interfaces a subscriber within the exchange system under the control of the LPM 16. In this configuration, the processing modules are connected through a VME (Versa Mode European) bus, and a common memory (CM) for transmitting/receiving a message between the CPM 12 and the SPM 14 is positioned in the SPM 14. The event from the subscriber's telephone 20 is transmitted to the CPM 12 through the subscriber control module 18, LPM 16 and SPM 14, and the event from another node is transmitted to the CPM 12 through the INI 22, LPM 16 and SPM 14. That is, the event from a subscriber or another node is transmitted to the CPM 12 through the SPM 14. Similarly, the message from the CPM 12 is transmitted to its destination (i.e. the subscriber's telephone 20 or a different mode) through the SPM 14. Consequently, it will be readily appreciated that to transmit/receive a message between the SPM 14 and the CPM 12 is important enough to determine a speed of a call process of a system. Generally, a common memory such as a dual port memory capable of simultaneously reading and writing is used for transmitting/receiving a message between the SPM 14 and the CPM 12. However, in a conventional method for transmitting/receiving a message by means of the common memory, since a transmitting part simply writes data into the common memory and a receiving part reads the data, it is difficult to transmit/receive a message at high speed. That is, although the transmitting part has a transmitting message, if the receiving part does not read the data since a buffer of the common memory used in transmitting a message is full, the message of the transmitting part can not be transmitted at high speed.

SUMMARY OF THE INVENTION

It is therefore an object of the present invention to provide a communicating method capable of transmitting/receiving a message between a signal processor and a central processor in a decentralized multi-node exchange system at high speed by controlling an interruption of transmitting/receiving messages.

In accordance with one aspect of the present invention, there is provided a method for transmitting a message, including the steps of: checking whether or not a message transmitting buffer is in a full state by reading the data stored in transmitting administrative buffers of the common memory for transmitting a message; storing a transmitting message in a message transmitting buffer corresponding to a block number of the transmitting administrative buffer when the message transmitting buffer is not in a full state, and increasing the data of the transmitting administrative buffer; and generating interrupt to the central processing module when the message transmitting buffer is in a full state.

In accordance with another aspect of the present invention, there is provided a method for receiving a message, including the steps of: setting the number of a receiving message during one period when interrupt is generated, and resetting the number of a received message during a present read period; reading the data stored in receiving administrative buffers from the common memory for receiving a message, and checking whether or not messages corresponding to the number of the receiving message are received by comparing the number of the receiving message with the number of the received message; finishing the receipt of a message when the messages corresponding to the number of the receiving message are received, and checking whether or not there is a receiving message when the messages corresponding to the number of the receiving message are not received; and receiving the data stored in a message receiving buffer corresponding to a block number of the receiving administrative buffer when a receiving message is detected, increasing the receiving administrative buffer and the number of the received message by one, and returning to the reading step.

BRIEF DESCRIPTION OF THE DRAWINGS

For more complete understanding of the present invention, reference should be made to the following detailed description, in conjunction with the accompanying drawings, in which.

DETAILED DESCRIPTION OF THE PREFERRED EMBODIMENT

Figure 1:
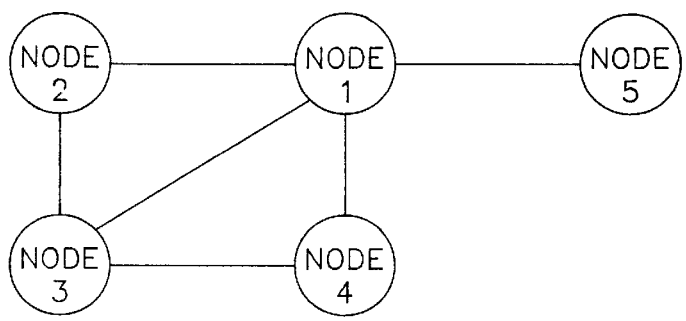
FIG. 1 is a diagram showing the configuration of a decentralized multi-node exchange system.
Figure 2:
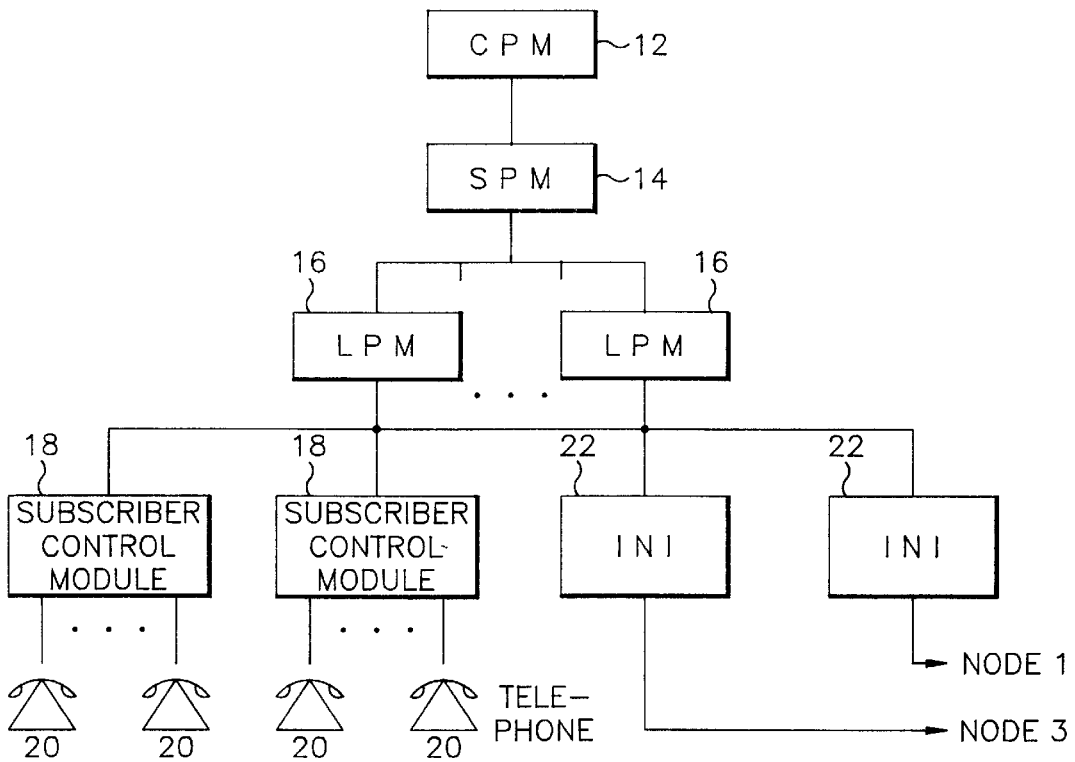
FIG. 2 is a block diagram of each node of FIG. 1.
Figure 3:
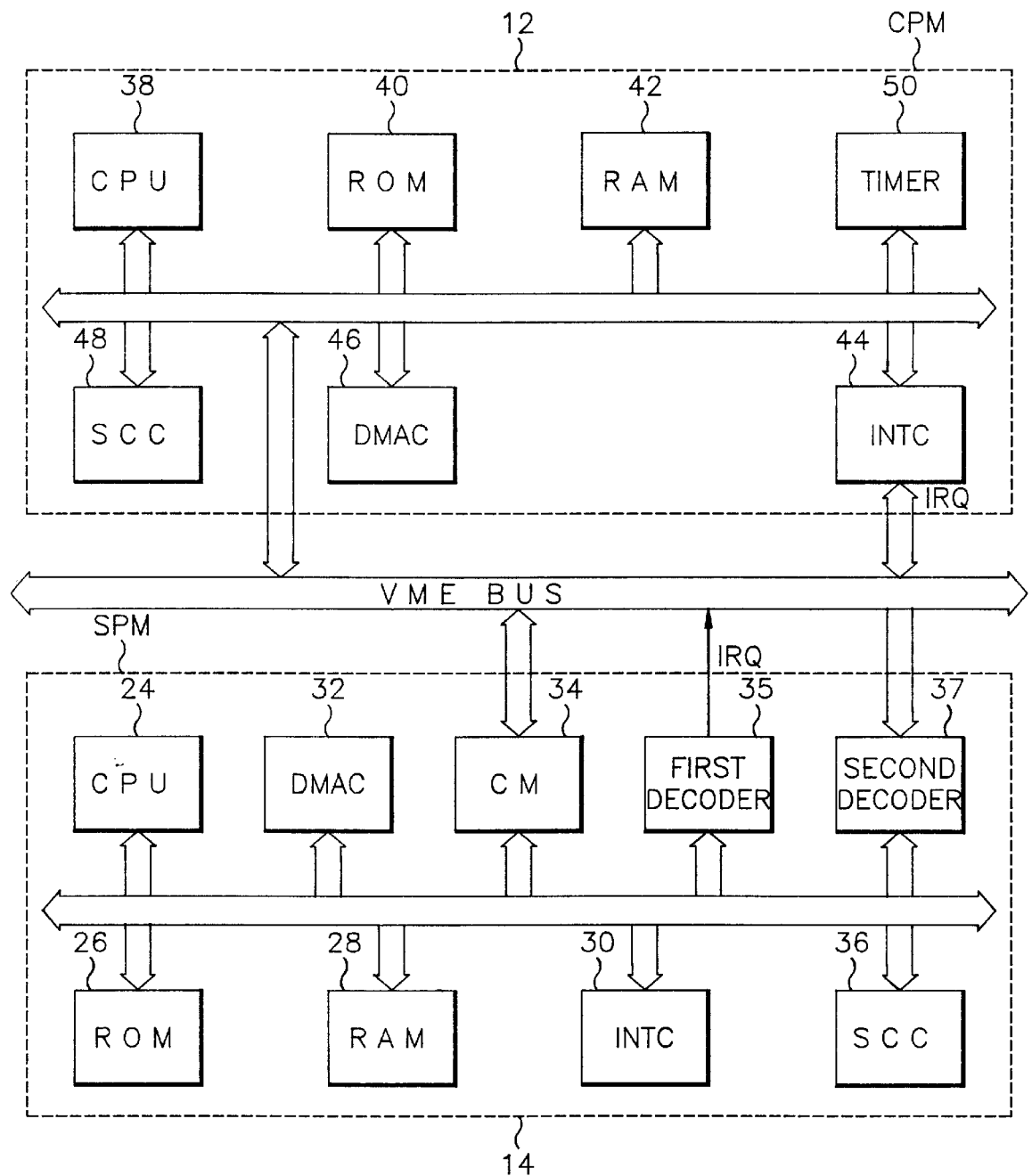
FIG. 3 is a block diagram of a central process module and a signal processing module of FIG. 2 applied to the present invention.

Referring to FIG. 3, a central processing unit (CPU) 24 in charge of a signal process controls the operation of a SPM 14. A read only memory (ROM) 26 and a random access memory (RAM) 28 store respectively a program and various data generated during performing the program. An interrupt controller (INTC) 30 executes various interrupts, and a direct memory access controller (DMAC) 32 controls the direct memory access. A serial communication controller (SCC) 36 is an input/output device for communicating with a line processing module (LPM). A common memory (CM) 34 is a dual port memory which can simultaneously access information from the CPM 12 and the SPM 14 and transmits/receives a message therebetween. A first decoder 35, if a specific address is accessed from the SPM 14, decodes the accessed address so as to generate interrupt to the CPM 12. If the CPM 12 accesses a specific address, a second decoder 37 decodes the accessed address so as to generate interrupt to the SPM 14. On the other hand, the CPM 12 for controlling the decentralized multi-node exchange includes a CPU 38, a ROM 40, a RAM 42, an INTC 44, a DMAC 46, a SCC 48 and a timer 50. Thus, a message is effectively transmitted and received through a common memory between the SPM 14 and the CPM 12 by an interrupt signal of the first and second decoders 35 and 37.

Since the SPM 14 and the CPM 12 configured in the above-mentioned way transmit/receive a message in the same way, processes for transmitting/receiving the message at the SPM side will be described in detail.

Figure 4:
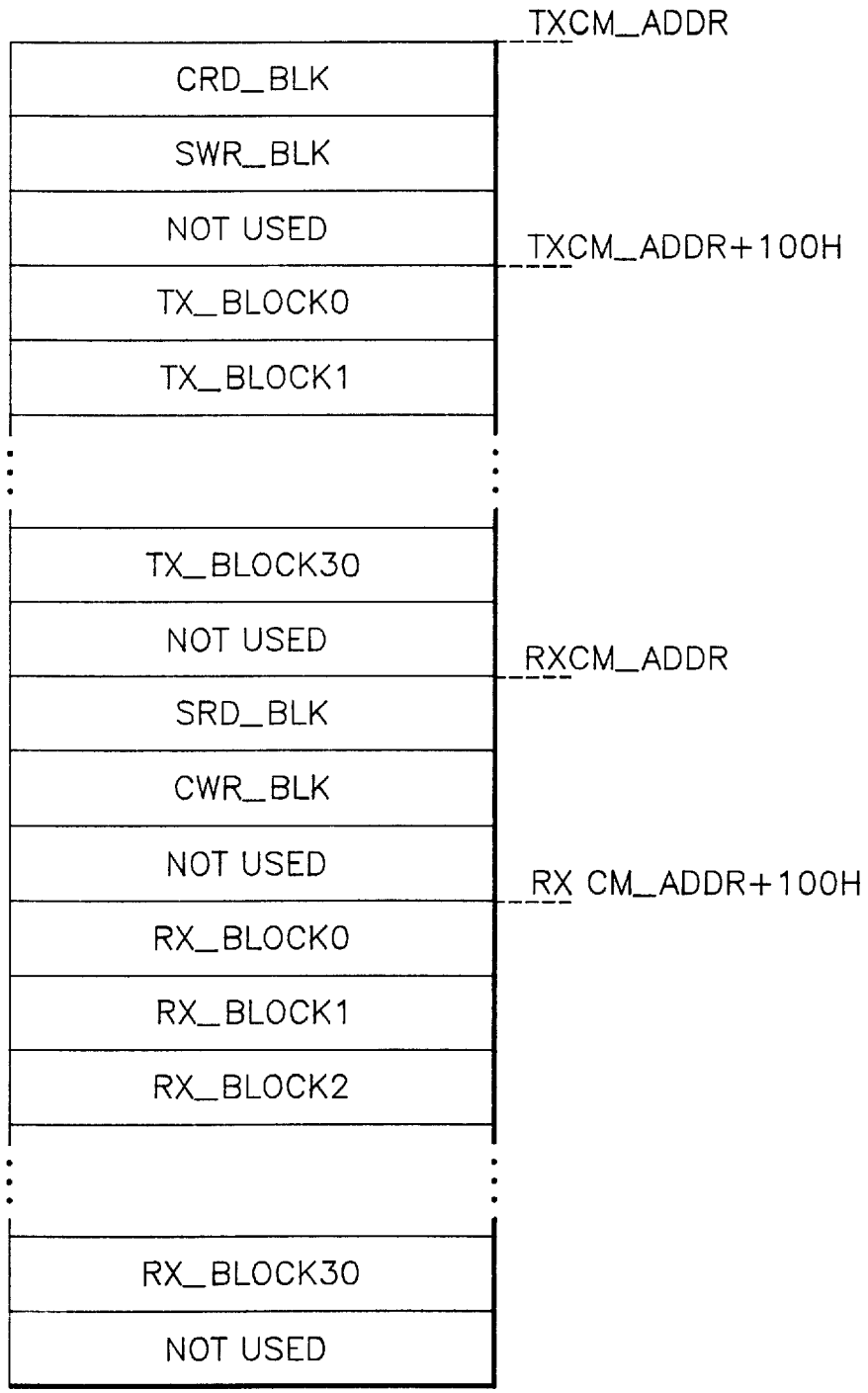
FIG. 4 is a diagram showing the configuration of a common memory of FIG. 3 applied to the present invention.

Referring to FIG. 4, it is assumed that the size of the common memory 34 in the SPM 14 is 64 Kbytes, and the size of a transmitting/receiving message between the SPM 14 and CPM 12 is not over 1 Kbyte. A block number to be read next from the CPM 12 is stored in an area CRD-BLK, and SWR-BLK is a buffer area where a block number to be transmitted next from the SPM 14 is stored. These areas are 2 bytes in size and administer message transmitting buffers TX-BLOCK0 to TX-BLOCK30 have the size of 1 kbyte. Moreover, in an area SRD-BLK, a block number to be read next from the SPM 14 is stored, and in CWR-BLK, a block number to be transmitted next from the CPM 12 is stored. These areas are also 2 bytes and message receiving buffers RX-BLOCK0 to RX-BLOCK30 have the size of 1 kbyte are buffers for receiving a message. If the data of the transmitting administrative buffers CRD-BLK and SWR-BLK have the same value, one of the transmitting buffers in the common memory 34 is in an empty state, and if the data of the CRD-BLK has a larger value than that of the SWR-BLK by one, the transmitting buffers in the common memory 34 are in a full state. The SWR-BLK is increased whenever the SPM 14 writes a message, and the CRD-BLK is increased whenever the CPM 12 reads a message. The message receiving buffers RX-BLOCK0 to RX-BLOCK30 are administered by the receiving administrative buffers SRD-BLK and CWR-BLK. In the same way, if the data of the SRD-BLK and CWR-BLK have the same value, there is no a message in receiving buffers, or one of the receiving buffers in the common memory 34 is an empty state and if the data of the SRD-BLK has a larger value than that of the CWR-BLK by one, the receiving buffers of the common memory 34 are in a full state. Also, if the data of the SRD-BLK has a lower value than that of the CWR-BLK, the common memory 34 is in an empty state. The CWR-BLK is increased whenever the CPM 12 writes a message, and the SRD-BLK is increased whenever the SPM 14 reads a message.

Figure 5:
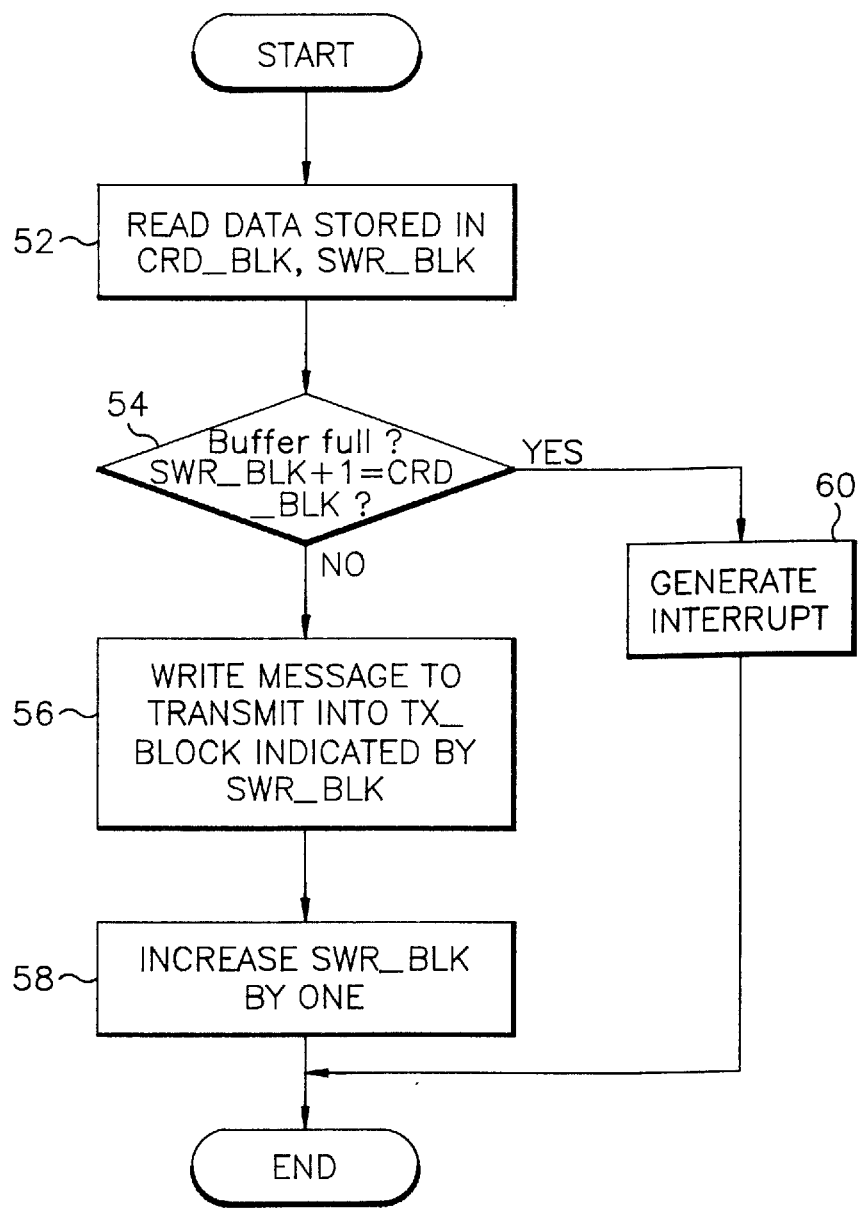
FIG. 5 is a flowchart showing a message transmitting procedure according to the present invention.

Referring to FIG. 5, a message transmitting procedure from the SPM 14 to the CPM 12 of FIG. 3 is shown. If there is a transmitting message to the CPM 12, the CPU 24 in the SPM 14 reads, in step 52, the data of the transmitting administrative buffers CRD-BLK and SWR-BLK from the common memory 34 for transmitting a message. This is followed by step 54 to see if there is an empty message transmitting buffer by comparing the data of the CRD-BLK with that of the SWR-BLK. If the empty transmitting buffers detected, step 54 is succeeded by step 56. In step 56, the CPU 24 writes a transmitting message into the message transmitting buffer TX-BLOCK indicated by the transmitting administrative buffer SWR-BLK. In following step 58, the data of the SWR-BLK is increased by one. If the data of the CRD-BLK is larger than that of the SWR-BLK by one since all the message transmitting buffers TX-BLOCK0 to TX-BLOCK30 are determined to be a full state, step 54 proceeds to step 60 where an address for generating an interrupt to the first decoder 35 is written. In this instance, the first decoder 35 decodes the accessed address by the CPU 24 to generate an interrupt request signal to the INTC 44 in the CPM 12. That is, if there is no empty transmitting buffers, the CPU 24 in the SPM 14 generates an interrupt to the CPM 12 through the first decoder 38 so as to empty the data of the message transmitting buffer TX-BLOCK in the common memory. In this case, the CPU 38 in the CPM 12 receiving the interrupt request signal reads a message stored in the message transmitting buffer of the common memory 34 through the VME bus. Therefore, the CPM 12 rapidly reads a receiving message in the common memory 34 by the interrupt of the SPM 14. During transmission of a message from the CPM 12 to the SPM 14, above-mentioned processes are similarly applied, and in this case, the interrupt request signal from the CPM 12 to the SPM 14 is generated through the second decoder 37.

Figure 6:
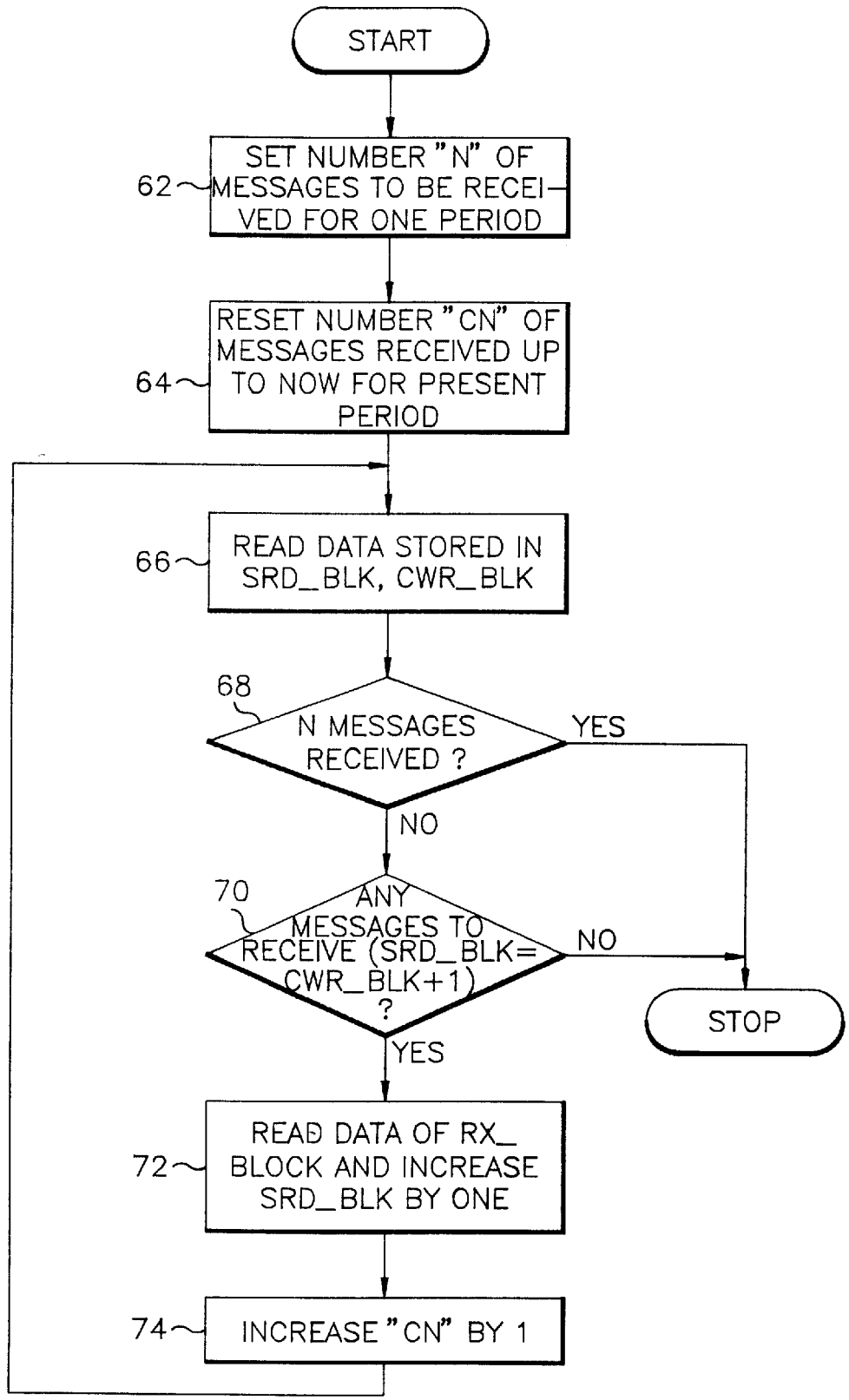
FIG. 6 is a flowchart showing a message receiving procedure according to the present invention.

Referring to FIG. 6, a message receiving procedure by the SPM 14 when the CPM 12 transmits a message to the common memory 34 is shown. The message receiving procedure is executed in response to the interrupt request signal out put from the CPM 12 or in response to each given period of time. If the interrupt request signal is generated, or if it is the period of time to receive a message, the CPU 24 in the SPM 14 sets, in step 62, the number N of a receiving message received during one period of time. The number N is between 1 and 31 so as not to exceed the number of the message receiving buffers in the common memory 34. In case of reading only one message at a time, since an interrupt may be continuously generated when there are various messages, the number N is set for receiving n messages during one period of time. In step 64, the CPU 24 resets the number CN of a received message up to present during a present period of time to 0. This is followed by step 66 where the CPU 24 reads the data of the receiving administrative buffers SRD-BLK and CWR-BLK from the common memory 34 for receiving a message. Next, in step 68, a determination is made whether or not n messages are received, that is, whether or not the number N is equal to CN is checked. If the N is equal to CN, since n messages have been read during one period of time, operation for receiving a message is ended. If the n messages are not received, step 68 proceeds to step 70 to see if there is a receiving message by comparing the data of the SRD-BLK with that of the CWR-BLK. If there is the receiving message, step 70 advances to step 72, and otherwise, the operation for receiving a message is ended. In step 72, the data of the message receiving buffer RX-BLOCK indicated by the receiving administrative buffer SRD-BLK is read and the value of the SRD-BLK is increased by one. Step 72 is followed by step 74 to increase the number CN by one, and step 74 returns to step 66 until the n messages are received.

As described above, messages can be transmitted/received at high speed by generating interrupt in communication using a common memory.

While preferred embodiments of the present invention have been particularly shown and described, it will be understood by those skilled in the art that foregoing and other changes in form and details may be made without departing from the spirit and scope of the present invention.

What is claimed is:

1. A communicating method between processors in a decentralized multi-node exchange system having a central processing module for controlling said exchange system by processing events related to a call process generated within said exchange system, and a signal processing module including a common memory, for transmitting and receiving signal messages generated within said exchange system to and from said central processing module through said common memory, said method comprising:

a message transmitting process of checking whether a message transmitting buffer within said common memory is in a full state by comparing values indicated by data stored in first and second administrative buffers located within said common memory, said first administrative buffer storing data indicative of a first address block within said common memory to be read next from one of said central processing module and said signal processing module, said second administrative buffer storing data indicative of a second address block within said common memory to be transmitted next from one of said central processing module and said signal processing module, said message transmitting process further comprising steps of transmitting said signal messages to said second address block within said message transmitting buffer when said message transmitting buffer is not in said full state, and transmitting an interrupt to one of said central processing module and said signal processing module receiving said signal messages when said message transmitting buffer is in said full state; and a message receiving process performed in response to one of an interrupt request signal and passage of a given period of time, said message receiving process comprising steps of setting a designated number of said signal messages to be received, and receiving a quantity of said signal messages corresponding to said designated number from a message receiving buffer located within said common memory;

said message transmitting process further comprising the step of determining that said message transmitting buffer is in said full state when a value indicated by said data stored in said first administrative buffer is greater than a value indicated by said data stored in said second administrative buffer.

2. The method as claimed in claim 1, wherein said message receiving process further comprises the step of:

resetting a count value indicative of a quantity of said signal messages that have been received during a present read period after said step of setting said designated number of said signal messages to be received.

3. The method as claimed in claim 2, wherein said message receiving process further comprises the step of:

reading data stored in said first and second administrative buffers from said common memory, and checking whether said designated number of said signal messages has been received by comparing said count value with said designated number.

4. The method as claimed in claim 3, wherein said message receiving process further comprises the step of:

terminating said message receiving process when said designated number of said signal messages has been received, and checking whether there are any said signal messages to be received when said designated number of said signal messages has not been received.

5. The method as claimed in claim 4, wherein said message receiving process further comprises the step of:

receiving said signal messages stored in said first address block when there are said signal messages to be received, increasing said value indicated by said data stored in said first administrative buffer by a constant, increasing said count value by said constant, and returning to said reading step.

6. A communicating method between processors in a decentralized multi-node exchange system having a central processing module for controlling said exchange system by processing events related to a call process generated within said exchange system, and a signal processing module including a common memory, for transmitting and receiving signal messages generated within said exchange system to and from said central processing module through said common memory said method comprising:

a message transmitting process of checking whether a message transmitting buffer within said common memory is in a full state by comparing values indicated by data stored in first and second administrative buffers located within said common memory, said first administrative buffer storing data indicative of a first address block within said common memory to be read next from one of said central processing module and said signal processing module, said second administrative buffer storing data indicative of a second address block within said common memory to be transmitted next from one of said central processing module and said signal processing module, said message transmitting process further comprising steps of transmitting said signal messages to said second address block within said message transmitting buffer when said message transmitting buffer is not in said fall state, and transmitting an interrupt to one of said central processing module and said signal processing module receiving said signal messages when said message transmitting buffer is in said full state; and a message receiving process performed in response to one of an interrupt request signal and passage of a given period of time, said message receiving process comprising steps of setting a designated number of said signal messages to be received and receiving a quantity of said signal messages corresponding to said designated number from a message receiving buffer located within said common memory;

wherein said message transmitting process further comprises the steps of:

determining that said message transmitting buffer is in said full state when a value indicated by said data stored in said first administrative buffer is greater than a value indicated by said data stored in said second administrative buffer; and increasing said value indicated by said data stored in said second administrative buffer by a constant after said step of transmitting said signal messages to said second address block within said message transmitting buffer.

7. The method as claimed in claim 6, wherein said message receiving process further comprises the step of:

resetting a count value indicative of a quantity of said signal messages that have been received during a present read period after said step of setting said designated number of said signal messages to be received.

8. The method as claimed in claim 7, wherein said message receiving process further comprises the step of:

reading data stored in said first and second administrative buffers from said common memory, and checking whether said designated number of said signal messages has been received by comparing said count value with said designated number.

9. The method as claimed in claim 8, wherein said message receiving process further comprises the step of:

terminating said message receiving process when said designated number of said signal messages has been received, and checking whether there are any said signal messages to be received when said designated number of said signal messages has not been received.

10. The method as claimed in claim 9, wherein said message receiving process further comprises the step of:

receiving said signal messages stored in said first address block when there are said signal messages to be received, increasing said value indicated by said data stored in said first administrative buffer by a constant, increasing said count value by said constant, and returning to said reading step.

11. A communicating method between processors in a decentralized multi-node exchange system having a central processing module for controlling said exchange system by processing events related to a call process generated within said exchange system, and a signal processing module including a common memory, for transmitting and receiving signal messages generated within said exchange system to and from said central processing module through said common memory, said method comprising:

a message transmitting process of checking whether a message transmitting buffer within said common memory is in a full state by comparing values indicated by data stored in first and second administrative buffers located within said common memory, said first administrative buffer storing data indicative of a first address block within said common memory to be read next from one of said central processing module and said signal processing module, said second administrative buffer storing data indicative of a second address block within said common memory to be transmitted next from one of said central processing module and said signal processing module, said message transmitting process further comprising steps of transmitting said signal messages to said second address block within said message transmitting buffer when said message transmitting buffer is not in said fall state, and transmitting an interrupt to one of said central processing module and said signal processing module receiving said signal messages when said message transmitting buffer is in said full state; and a message receiving process performed in response to one of an interrupt request signal and passage of a given period of time, said message receiving process comprising steps of setting a designated number of said signal messages to be received, and receiving a quantity of said signal messages corresponding to said designated number from a message receiving buffer located within said common memory;

wherein said message receiving process further comprises the steps of:

resetting a count value indicative of a quantity of said signal messages that have been received during a present read period after said step of setting said designated number of said signal messages to be received;

reading data stored in said first and second administrative buffers from said common memory, and checking whether said designated number of said signal messages have been received by comparing said count value with said designated number;

terminating said message receiving process when said designated number of said signal messages has been received, and checking whether there are any said signal messages to be received when said designated number of said signal messages has not been received; and receiving said signal messages stored in said first address block when there are said signal messages to be received, increasing said value indicated by said data stored in said first administrative buffer by a constant, increasing said count value by said constant and returning to said reading step.

12. A message transmitting method between processors in a decentralized multi-node exchange system having a central processing module for controlling said exchange system by processing events related to a call process generated within said exchange system, and a signal processing module including a common memory, for transmitting and receiving signal messages generated within said exchange system to and from said central processing module through said common memory, said method comprising:

reading data stored in first and second administrative transmitting buffers from said common memory, said first administrative transmitting buffer storing data indicative of a first address to be read next from said central processing module, said second administrative transmitting buffer storing data indicative of a second address to be transmitted next from said signal processing module;

determining whether a message transmitting buffer within said common memory is in a full state by comparing said data stored in said first administrative transmitting buffer with said data stored in said second administrative transmitting buffer, said message transmitting buffer being in said full state when said data stored in said first administrative transmitting buffer represents a value greater than a value represented by said data stored in said second administrative transmitting buffer;

generating an interrupt request signal if said determining step indicates that said message transmitting buffer is in said full state; and transmitting said signal messages to said second address when said message transmitting buffer is not in said full state, and then increasing said value represented by said data stored in said second transmitting administrative buffer by a constant.

13. A message receiving method between processors in a decentralized multi-node exchange system having a central processing module for controlling said exchange system by processing events related to a call process generated within said exchange system, and a signal processing module including a common memory, for transmitting and receiving signal messages generated within said exchange system to and from said central processing module through said common memory, said method comprising:

setting a maximum number of said signal messages to be received during a given period of time, and resetting a count value indicative of a quantity of said signal messages that have been currently received;

reading data stored in first and second administrative receiving buffers from said common memory, said first administrative receiving buffer storing data indicative of a first address to be read next from said signal processing module, said second administrative receiving buffer storing data indicative of a second address to be transmitted next from said central processing module;

checking whether said maximum number of said signal messages have been received by comparing said maximum number with said count value, and terminating said message receiving method if it is determined that said maximum number of said signal messages have been received;

determining whether any said signal messages are available for receipt by comparing said data stored in said first administrative receiving buffer with said data stored in said second administrative receiving buffer, said signal messages being available for receipt when said data stored in said first administrative receiving buffer represents a value greater than a value represented by said data stored in said second administrative receiving buffer; and receiving data stored in a message receiving buffer corresponding to said first address, increasing said value represented by said data stored in said first administrative receiving buffer by a constant, increasing said count value by said constant, and returning to said reading step when said determining step indicates that said signal messages are available for receipt.

* * * * *